United States Patent [19]

Ackeret

[11] Patent Number: 4,705,166
[45] Date of Patent: Nov. 10, 1987

[54] CONTAINER FOR A GRAMOPHONE RECORD OR VIDEO DISC

[75] Inventor: Peter Ackeret, Küsnacht, Switzerland

[73] Assignee: Ind Inventions and Development of Novelties AG, Chur, Switzerland

[21] Appl. No.: 905,588

[22] PCT Filed: Dec. 14, 1985

[86] PCT No.: PCT/EP85/00706
§ 371 Date: Aug. 15, 1986
§ 102(e) Date: Aug. 15, 1986

[87] PCT Pub. No.: WO86/03878
PCT Pub. Date: Jul. 3, 1986

[30] Foreign Application Priority Data

Dec. 18, 1985 [DE] Fed. Rep. of Germany ....... 8436935

[51] Int. Cl.[4] .............................................. B65D 85/57
[52] U.S. Cl. .................................... 206/309; 206/444; 312/15
[58] Field of Search ............... 206/309, 312, 445, 444, 206/387; 312/15, 8-14, 16-19

[56] References Cited

U.S. PATENT DOCUMENTS 1,569,207 1/1926 Sears ...................................... 312/15
4,630,732 12/1986 Snyman .......................... 206/309 X
4,641,747 2/1987 Mestdagh et al. .................. 206/309

FOREIGN PATENT DOCUMENTS 112436 7/1984 European Pat. Off. ............ 206/387
139161 5/1985 European Pat. Off. ............ 206/309
2248408 1/1974 Fed. Rep. of Germany ...... 206/387
3216888 9/1983 Fed. Rep. of Germany ...... 206/444

Primary Examiner—William Price
Attorney, Agent, or Firm—Chilton, Alix & Van Kirk

[57] ABSTRACT

A container for a gramophone record or video disc (56) having a housing (10) in which at least one holder (18) accommodating one disc (56) is slideably guided between an inner storage position and an outer removal position. The holder (18) is biassed by a spring assembly (40), and has a locking arrangement (42, 48) which holds the holder (18) in its storage position in the housing (10) against the spring bias and is manually releasable. Each holder (18) has a front wall (32) which covers the housing opening in the storage position, and, in the removal position, the front wall (32) is pivoted transversely with respect to the alignment of the disc (56) to such an extent that the disc (56) is removable in alignment. An ejection mechanism acting on the disc (56) in the removal position is provided which transports the disc (56) further in the ejection direction to such an extent relative to the front wall (32) that it may be gripped pincer-fashion by its main surfaces.

24 Claims, 12 Drawing Figures

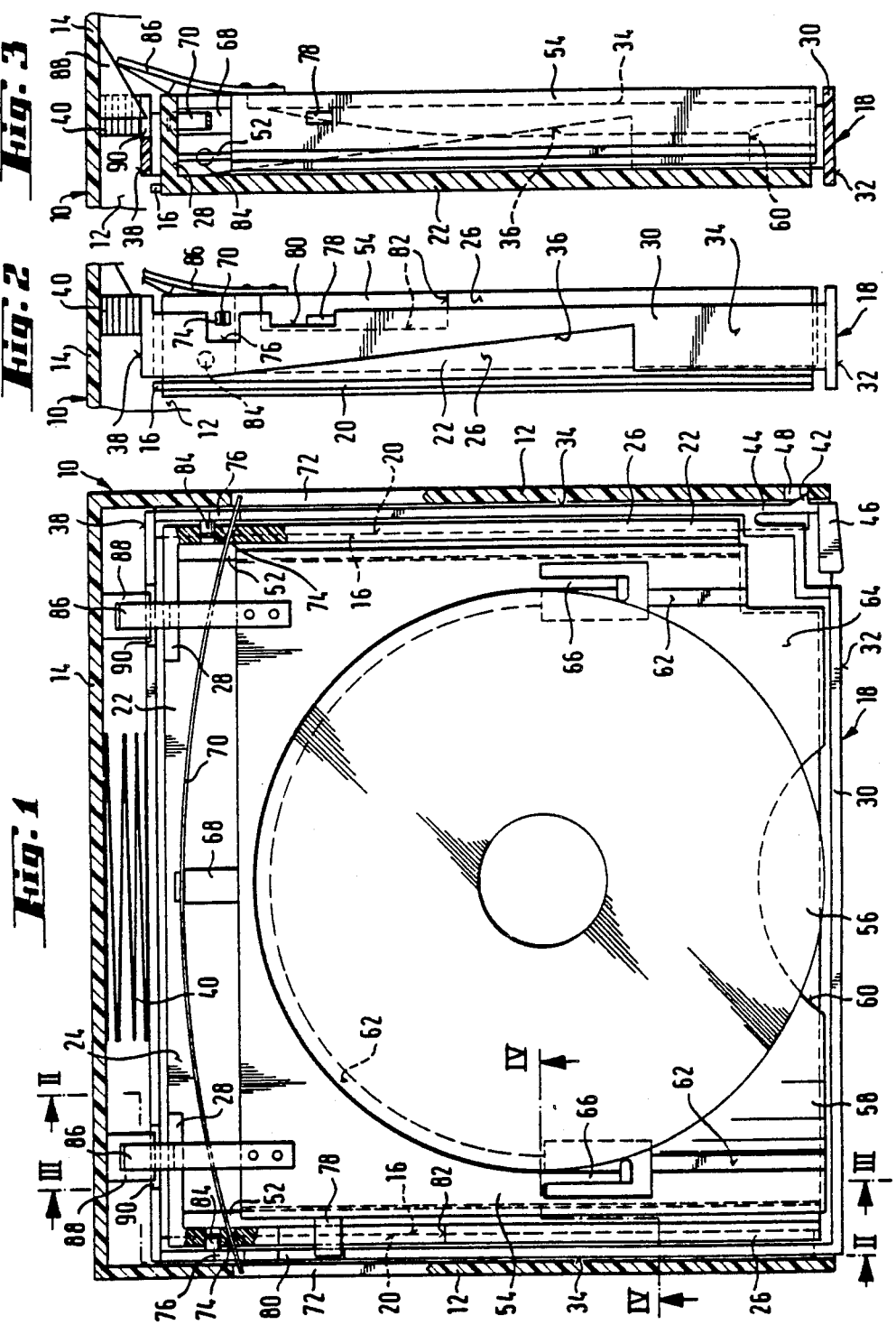

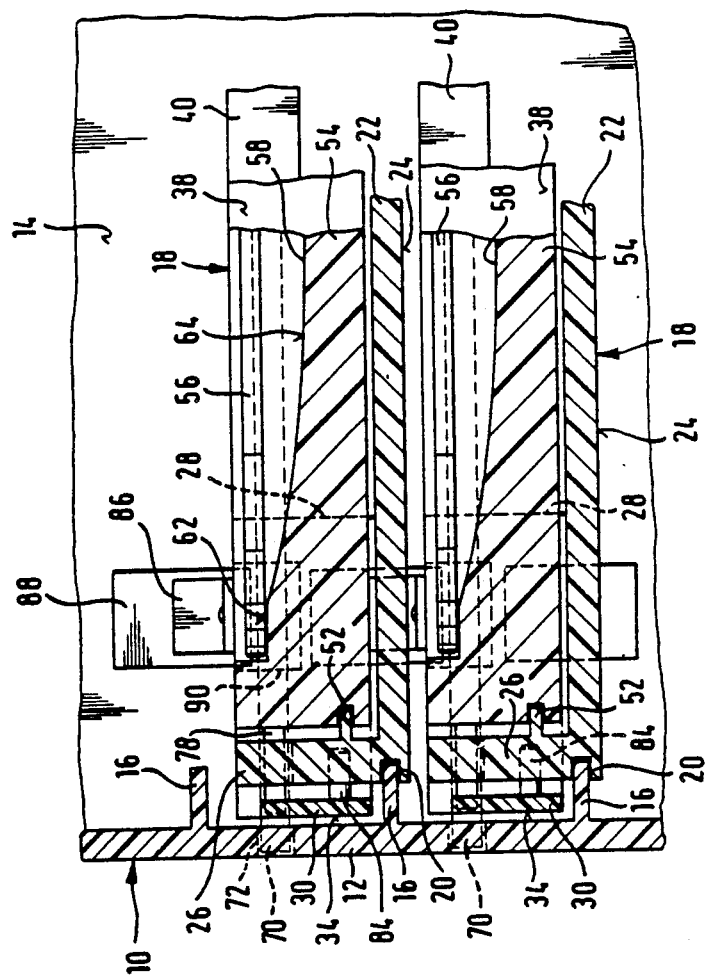

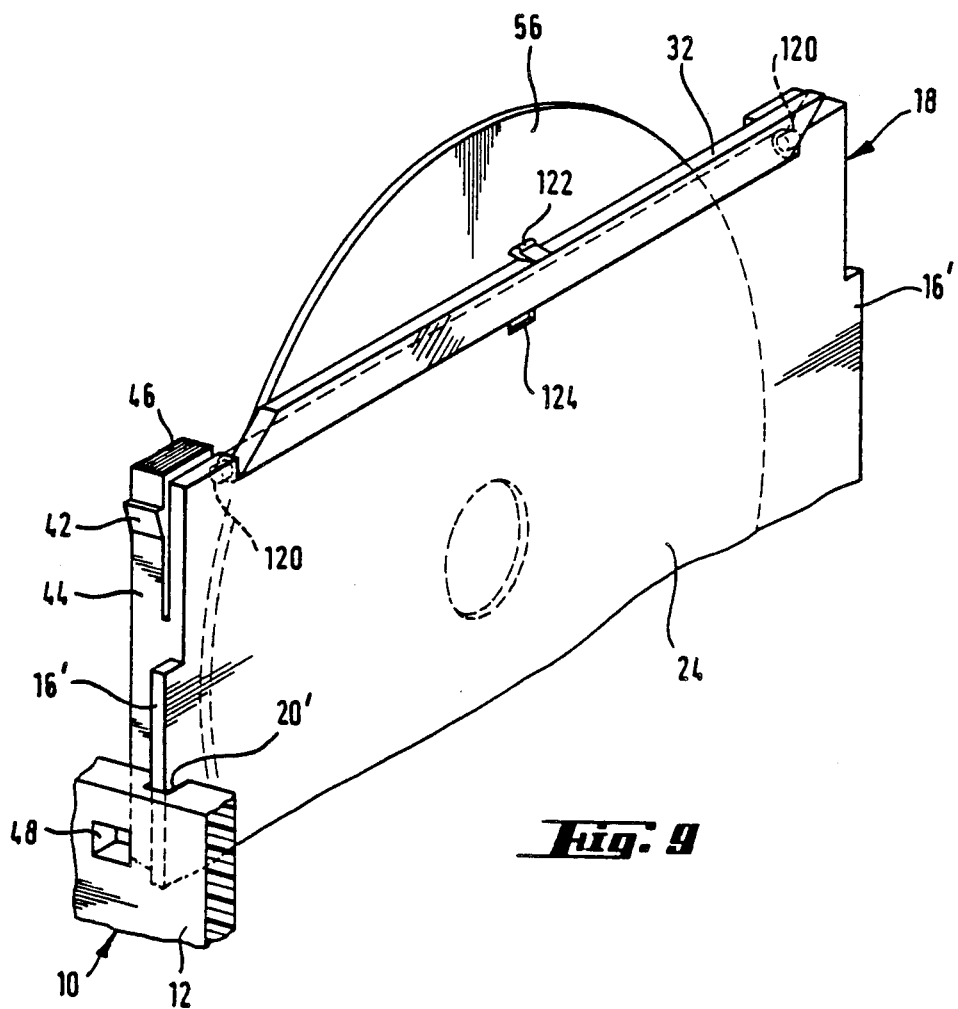

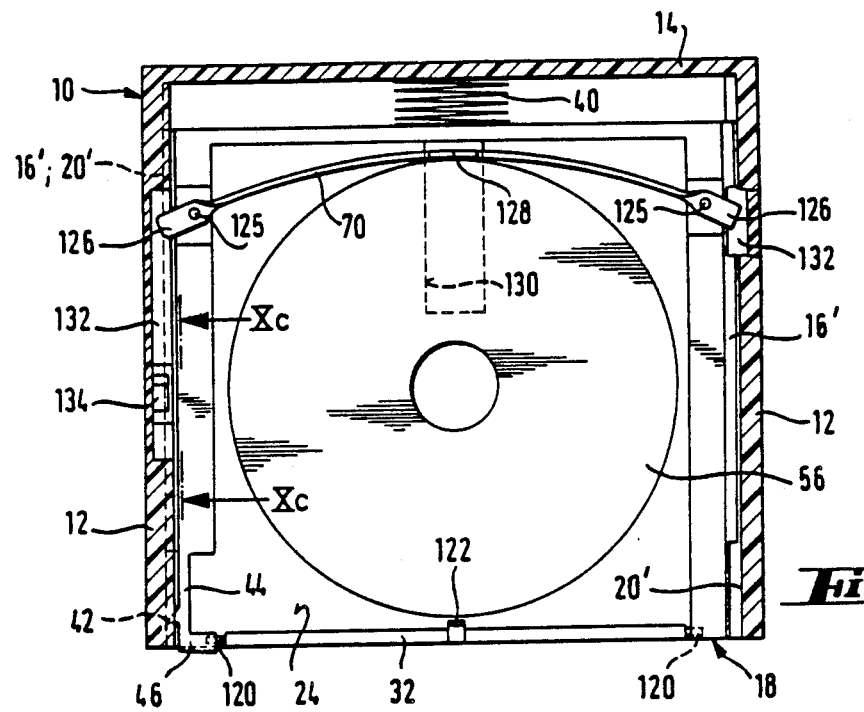
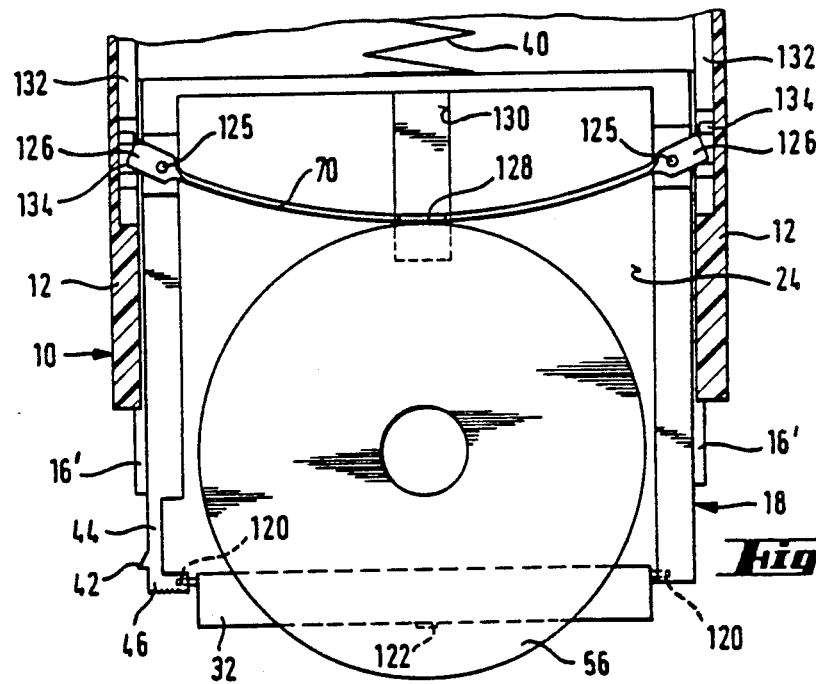

CONTAINER FOR A GRAMOPHONE RECORD OR VIDEO DISC

BACKGROUND OF THE INVENTION

The present invention relates to a container for a gramophone record or video disc, especially for a so-called compact disc.

A container for standard magnetic tape cassettes (compact cassettes) is known from published German Patent Specification No. 2 248 408. The container comprises a housing in which a holder for a magnetic tape cassette is slideably guided between an inner storage position and an outer removal position into which the holder is biassed by a spring assembly. In addition, there is provided a locking arrangement which holds the holder in its storage position in the housing against the spring bias and which may be released manually. The housing has a front wall which, in the storage position, covers the housing opening. In this known container, the holder is cut away at its sides so that the magnetic tape cassette may be gripped laterally at its edges and lifted out over the front wall of the holder.

This known construction is less suitable for compact discs or other disc-shaped recording media, such as gramophone records or video discs. The play-back equipment for such discs are, typically, designed having an insertion slot for the disc such that the user is required to hold the disc with its main surfaces gripped pincer-fashion between two fingers. It is therefore desirable to construct the container for such discs in such a manner that removal and insertion of the disc can be effected analogously, so that an additional manipulation of the disc is no longer necessary.

This ease of use is especially important when the container is installed in motor vehicles and is intended to be operated by the driver during travel. The operation of the container should require only the minimum of the driver's attention and dexterity in order to minimize any risk of an accident.

SUMMARY OF THE INVENTION

The objective of improving the ease of use of such known containers is accomplished according to the invention in that, when the disc is in the removal position, the front wall is pivoted transversely to the alignment of the disc to such an extent that the disc is removable in alignment. An ejectionmechanism acting on the disc in the removal position is provided which transports the disc further in the ejection direction to such an extent relative to the front wall that the disc may be gripped pincer-fashion by its main surfaces.

Because the container is additionally intended to have only the strictly necessary dimensions, this construction is especially suitable for accommodating a plurality of holders in a common housing, where the discs with their holders then lie stacked closely one on top of the other, but may nevertheless easily be removed and reinserted individually.

Further embodiments of the invention may be inferred from the following description and from the claims.

BRIEF DESCRIPTION OF THE DRAWINGS

The present invention is explained in greater detail below with reference to examples of embodiments illustrated in the accompanying drawings.

FIG. 1 shows in section a container for discs in the storage position.

FIG. 2 shows a section along the line II—II of FIG. 1.

FIG. 3 shows a section along the line III—III of FIG. 1.

FIG. 4 shows a section along the line IV—IV of FIG. 1.

FIG. 9 shows in a perspective view a portion of a further embodiment of a disc-holder for a container in accordance with the present invention.

DESCRIPTION OF THE PREFERRED EMBODIMENTS

Figure 5:
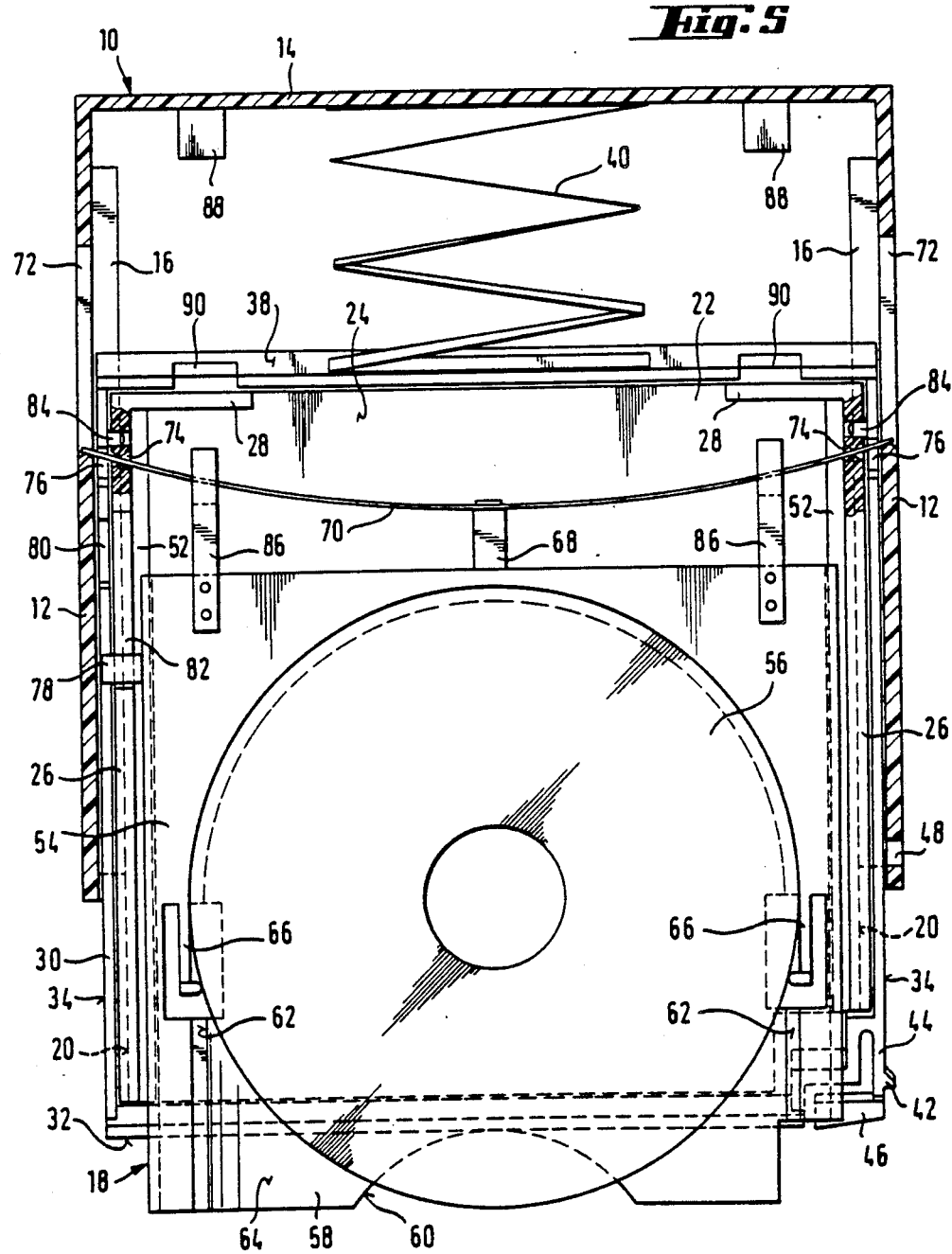
FIG. 5 shows in section the container of FIG. 1 in the removal position for a disc.

The container illustrated in FIGS. 1 to 5 is block-shaped and comprises a housing 10 including a floor, a top wall, two side walls 12 and a rear wall 14, such that the housing 10 is open at the front. The side walls 12 have a number of inwardly directed guide ribs 16 of which two ribs lying opposite serve to guide one disc-holder 18, which may have complementary guide grooves 20 for this purpose. The housing 10 holds several, for example six, disc holders 18 which are stacked closely together one above the other.

Each disc holder 18 consists of a slider member 22 comprising a base plate 24, side walls 26 and rear wall portions 28 adjoining the ends of the side walls furthest inside the housing. Each slider member 22 also has a frame 30 surrounding it, the frame consisting of a front wall 32, two lateral side members 34 having approximately triangular cuts-outs 36, and a rear wall 38 situated between the rear wall 14 of the housing 10 and the rear wall 28 of the slider member 22. There is a gap between the adjacent walls of the slider member 22 and the frame 30. The lateral side members 34 of the frame 30 are arranged with their bottom edge in such a manner that the guide grooves 20 of the slider member 22 remain empty for engagement with the guide ribs 16.

An ejector spring 40 which is braced against the inside of the rear wall 14 of the housing 10 acts on the rear wall 38 of the frame 30. The ejector spring 40 may, as shown, be a zigzag spring or a helical or leaf spring, or a similar type of spring; when using leaf springs these may also be combined in groups rather like a comb, one tongue engaging a rear wall 38 of one frame 30 in each case.

In its front wall region, the frame 30 is provided with a locking mechanism which, in the embodiment illustrated, consists of a hook-shaped latch 42 which is moulded on a resilient tongue 44 which at one end carries a release button 46 and at the other end is integrally joined to the frame 30. In the inserted state of the disc-holder 18 (FIG. 1), the latch 42 engages in a catch aperture 48 in the side wall 12 of the housing 10. To release the latch, the release button 46 is movable manually parallel to the principle plane of the disc-holder 18 and thus of the base plate 24, whereby the latch 42 is released from the catch aperture 48 and the disc-holder 18 is moved by virtue of the ejector spring 40 in the ejection direction.

The side walls 26 of the slider member 22 have inwardly directed guide ribs 52 which engage complementary lateral guide grooves in a storage plate 54 for a compact disc 56, which storage plate by this means is movably guided, relative to the slider member 22, out of the housing 10 in the direction in which the disc-holder 18 is ejected.

The storage plate 54 has a depression 58 which, starting from the rear of the plate, is semi-circular corresponding to the diameter of the compact disc 56. Once the depression has reached its full diameter transversely to the ejection direction, the depression maintains this width over the remaining extent of the plate to the front of the housing 10. The depression 58 is somewhat deeper than the thickness of a compact disc 56, so that the disk can be held easily by the depression 58. At the front, the storage plate 54 has a cut-out 60 which enables the compact disc 56 to be gripped when the disc holder 18 is ejected without colliding with the storage plate 54. At its edges, the depression 58 forms flat supporting surfaces 62 for the compact disc 56, while in the adjoining middle region there may be an additional trough-shaped depression 64 which serves to protect the compact disc 56 from becoming scratched. In addition, adjacent the region of the depression 58 of constant width there are provided two tongue-like draw-in arms 66 which may be deflected resiliently outwards in the plane of the holder and the free ends of which are bent inwards. The draw-in arms 66 position themselves with their bent portion laterally against the disc 56 when the disc is or has been inserted into the depression 58. By this means, when the disc-holder 18 is ejected from the housing 10 by the action of the ejector spring 40, the disc 56 is checked, so that it is not catapulted out and, when using the container in a motor vehicle, vibrations of the disc 56 in its disc-holder are absorbed. As a disc 56 is inserted, the draw-in arms 66 also ensure that the disc 56 reliably reaches its end position. The user clearly feels the checking force of the draw-in arms 66 being overcome so that he can be certain that the disc 56 is securely stowed away. The free ends of the draw-in arms 66 may further be bent over at right angles to engage over the disc 56 so that the draw-in arms 66 are not able to get underneath the disc 56. The center point of the disc 56 and the points of contact of the arms 66 define an angle in the range of 90° to 160° and preferably about 140°. In addition, holding-down members (not illustrated) engaging over the disc 56 may be provided, if desired, in the rear region of the storage plate 54.

At its end furthest inside the housing, the storage plate 54 has an extension 68, the free end of which is engaged by a flip-over, or "frog" 70. The flip-over spring 70 exends into opposing slots 72 in the side walls 12 of the housing 10 and in each case through an opening 74, which forms a pivot bearing, in the side walls 26, and through to adjacent cut-outs 76 in the side members 34. The flip-over spring 70 is a narrow leaf spring, for example.

In its rear region, the storage plate 54 has a lateral arm 78 which extends into a recess 80 situated in front of the cut-out 76 of the side member 34 on this side. A recess 82 is provided in the adjacent side wall 26 for this purpose. In the inserted position of the disc-holder 18 the arm 78 rests against the front edge of the recess 80 which is wider than the arm 78. The recess 82 extends further forwards towards the front of the housing 10 than the recess 80.

The frame 30 is mounted by means of pins 84 at the rear ends of the side walls 26 of the slider member 22, so that the frame is pivotable with respect to the slider member 22 and the storage plate 54.

As stated, above the storage plate 54 is coupled by its arm 78 with the frame 30 in the inserted position of the disc-holder 18. In this position the flip-over spring 70 is bent towards the rear wall 14 of the housing 10 and occupies its rear stable position. By pressing on the release button 46 the latch 42 is released, and thus the slider member 22, together with its frame 30 and the storage plate 54, is pushed out of the housing 10 by the action of the ejector spring 40 until the flip-over spring 70 comes to rest against the front end of the lateral slots 72 of the housing 10. Since the frame 30 is pivotable with respect to the slider member 22, its front wall 32 may be pivoted downwards manually owing to the cut-outs 36, or this may be effected automatically in that the ejector spring 40 acts in the upper region of the frame 30 and therefor eccentrically with respect thereto, as illustrated in this example of an embodiment. The cut-outs 36 are so shaped that they drop as far as the guide ribs 16 and the front wall 32 of the frame 30 moves with its upper edge below the lower edge of the storage plate 54. The arm 78 also is released as a result of this, and the storage plate 54 is therefore disengaged from the slider member 22. As a result of the pressure applied by the ejector spring 40, the flip-over spring 70 jumps into its front, second stable position, that is, into the position in which it is bent towards the front side, whereupon the storage plate 54 is pushed forwards with respect to the slider member 22 so that the disc 56 can be gripped and removed in alignment i.e., substantially along the plane in which the disc was stored in the housing.

Insertion is effected by exerting pressure on the storage plate 54 until the flip-over spring 70 takes up its rear stable position. It is necessary here for the storage plate 54 to be coupled to the slider member 22. This is effected by means of two catches 86 arranged at the rear end of the storage plate 54 which extend from there towards the rear wall 14. The catches 86 hook behind the rear wall portions 28 of the slider member 22. The frame 30, which previously has held the slider member 22 in the extended position, can now be folded up and pushed in together with the slider member 22 until the latch 42 snaps into the catch aperture 48. Shortly before the end position is reached, the two catches 86 are released again by control faces 88 on the rear wall 14 of the housing 10, since in this position the frame 30 together with the storage plate 54 is locked by the arm 78 again. So that the catches 86 remain released, the arm 78 shifts forwards in the recess 80. The rear wall 38 is provided with recesses 90 so that it does not collide with the control faces 88.

The front wall 32 of the frame 30 extends across the entire height of the slider member 22 so that the housing 10 is closed by the front walls 32 of the frames 30 arranged one above the other. The release buttons 46 are expediently arranged alternately on first one and then the other side of the housing.

Figure 6:
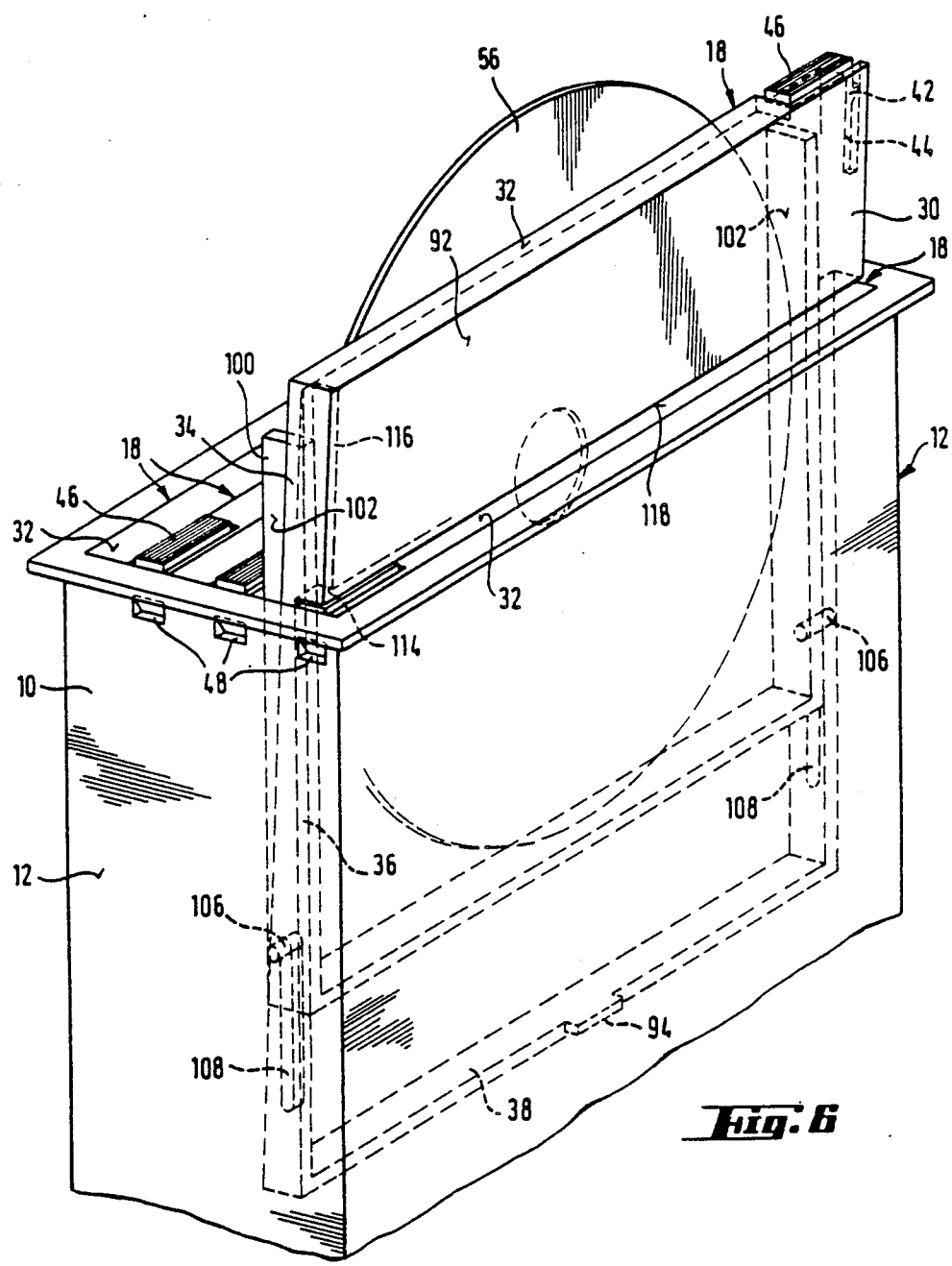
FIG. 6 shows in a perspective view the front end of a further embodiment of a container.
Figure 7:
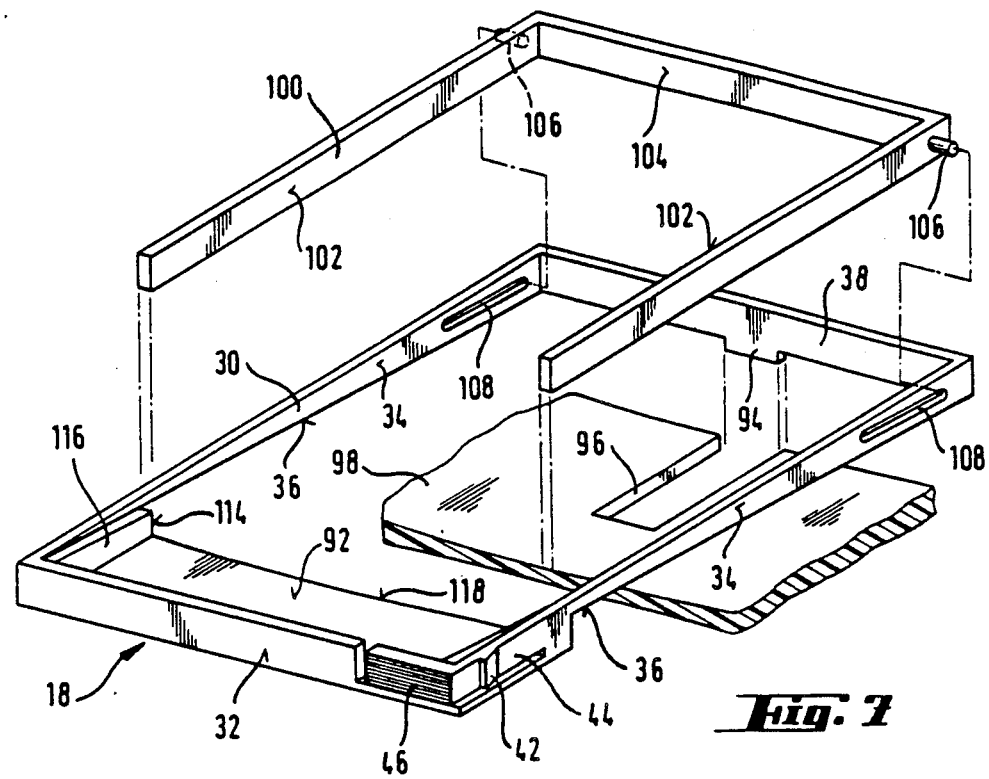
FIG. 7 shows, in a largely diagrammatic and partially broken away view, details of the container of FIG. 6.
Figure 8:
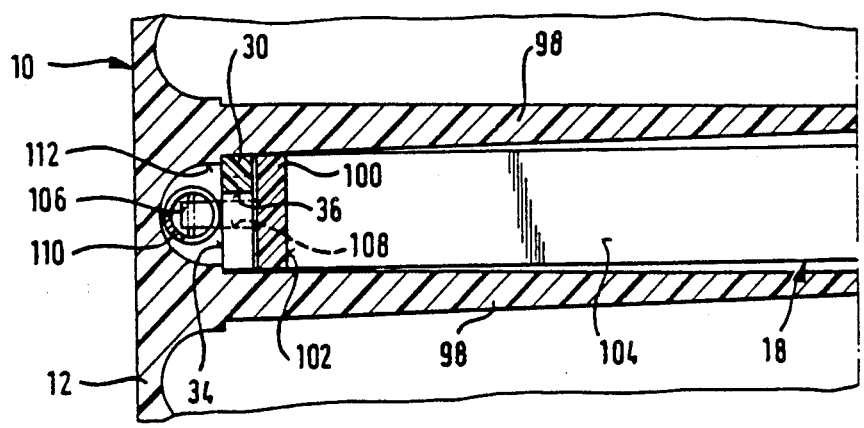
FIG. 8 shows in section details of the container of FIG. 6.

In the embodiment illustrated in FIGS. 6 to 8, the disc-holder 18 includes a frame 30 having a base plate 92 reinforcing the front end of the frame. The rear wall 38 of the frame 30 has a downwardly directed projection 94 which runs in a groove 96 of an intermediate floor 98 provided in the housing 10. The intermediate floors 98 have trough-like recesses on their top and bottom faces as indicated in FIG. 8, so that, as it is inserted, a disc 56 comes into contact only in its edge region with parts of the container, so that it is protected against scratching.

Furthermore, an inner frame 100 is provided, which has side walls 102 and a rear wall 104 connecting the side walls. The side walls 102 each have in their rear region an outwardly directed pin 106 which extends into an elongate slot 108 in the side member 34. On the end of each of the two pins 106 projecting beyond the elongate slot 108 there is hung a tension spring 110, the other end of which is secured close to the front opening of the housing 10 and which runs in a channel 112 of the side wall 12 (FIG. 8). The side walls 102 are shorter than the side members 34, so that when the disc-holder 18 is inserted the front ends of the side walls rest against the opposed faces 114 of control parts 116 which are moulded on the frame 30 in the corners between the side members 34, the front wall 32 and the base plate 92.

After the device has been manually unlocked, the tension springs 110 act on the inner frame 100 which transfers the force to the control parts 116 and thus to the outer frame 30. The two frames 30, 100 thus start to move outwards until the end edge 118 of the base plate 92 nearest the housing is completely in front of the housing 10. Immediately thereafter, the projection 94 strikes against the end of the groove 96, whereupon the frame 30 is able to tilt about an axis which lies on the line of contact between the projection 94 and the groove 96. This tilting movement is promoted in that the pins 106 run along the elongate slots 108, and the side walls 102 no longer strike against the control parts 116, while the elongate slot 108 in the tilted position of the frame 30 is parallel to the guided movement of the inner frame 100. The guiding mechanism is evident from FIG. 8. The disc 56 is therefore conveyed for the remainder of the path travelled by the inner frame 100, limited by the end of the elongate slots 108, over the front wall 32, so that the disc 56 porjects freely over this.

To insert the disc 56, the inner frame 100 is first pushed back by means of the disc 56, after which the frame 30 is tilted upwards and the entire disc-holder 18 is pushed in.

In the embodiment illustrated in FIG. 9, the disc-holder 18 has a base plate 24 with lateral guide rails 16' for engagement with complementary guide grooves 20' in the side walls 12 of the housing 10. The front wall 32 is pivotally joined to the base plate 24, for instance by means of hinge pins 120, as shown, or preferably by means of an integrally injection-mounled film-hinge. The front wall 32 is biassed by a spring in the opening-out direction and when the disc has been inserted locks with a catch 122 frictionally in a corresponding recess 124 on the underside of the next adjacent disc holder 18. The spring assembly 40 for biassing this disc holder 18 into the removal position may be a leaf spring that is attached by one end to the rear wall 14 of the housing 10 and with its free, extended end acts on the rear edge of the disc holder 18. The base plate 24 may have trough-like recesses on both sides.

Figure 10C:
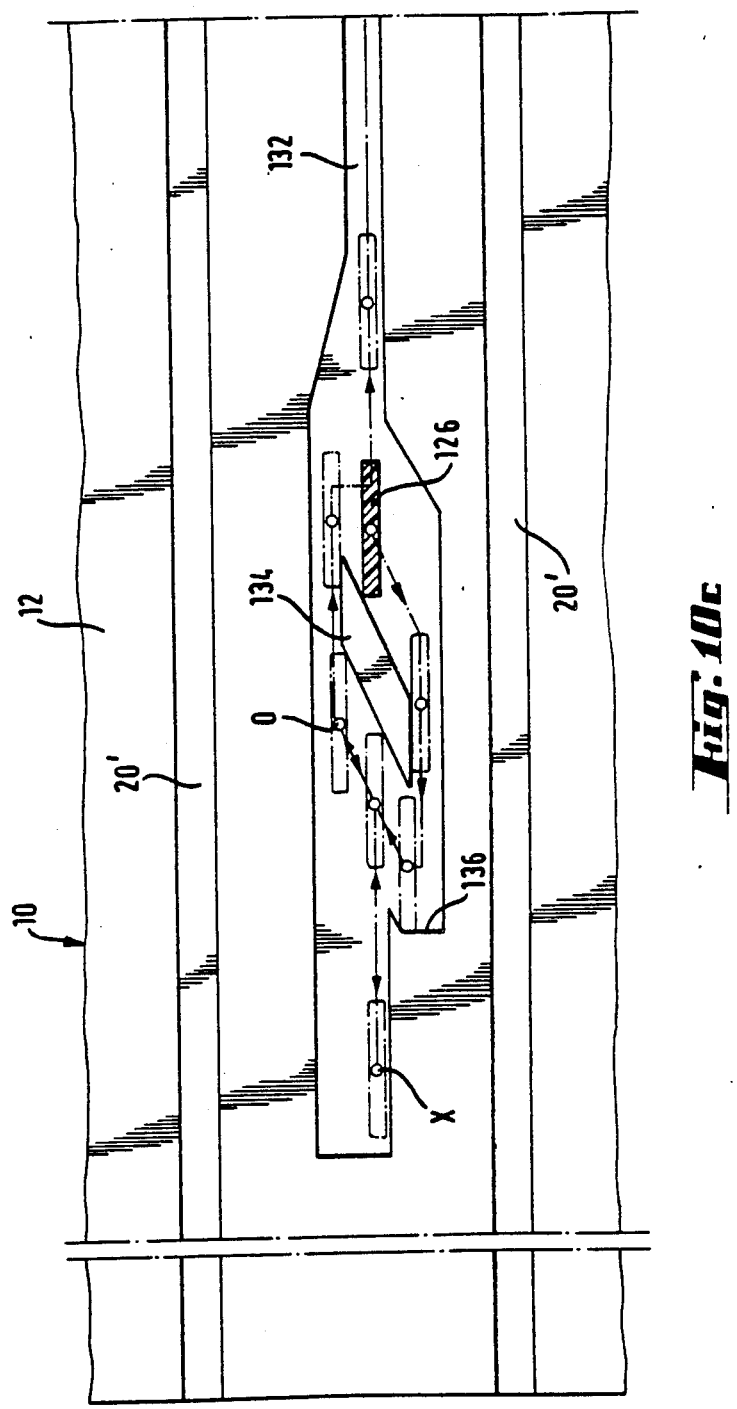
FIGS. 10a, b and c show a form of embodiment of an ejection mechanism for a disc.

In the case of the ejection mechanism illustrated in FIGS. 10a to 10c for a disc 56, on the disc holder 18 close to its two guided side edges there are provided bearing pins 125 on which a long metal flip-over spring 70 in the form of a leaf spring is placed. Adjacent the bearing pins 125 the flip-over spring 70 is twisted through 90°, so that its middle portion is gently resilient in the ejection direction, while its outer portions 126 in the region of the bearing pins 125 are rigid in this direction but yield resiliently at right angles thereto. The distance between the bearing pins 125 is smaller than the linear distance between the holes of the flip-over spring 70 so this is able to take up two stable positions. As soon as the locking of the disc-holder 18 is released by actuating the release button 46, the disc-holder 18 moves out of the housing 10, the disc 56 being supported at its end edge furthest inside the housing against the middle region of the flip-over spring 70. The disc 56 is prevented from slipping off by extensions 128 in the middle of the flip-over spring 70 which extend upwards and downwards into complementary grooves 130 of the disc-holder 18 located above and below them, wherein the latter groove is longer than the former by the outward travel distance of the disc-holder 18.

When the end position of the disc-holder is reached, the outer portions 126 of the flip-over spring 70 strike against corresponding stop members of the housing 10, whereby the flip-over spring 70 is brought under the action of an ejector spring 40 into its other stable position and the disc 56 is transported outwards for a corresponding distance, for instance over the folded-down front wall 32 of the disc-holder 18 of FIG. 9. As the disc is reinserted, the flip-over spring 70 snaps over into its rear stable position again.

Reversal of the flip-over spring 70 is effected in that its free ends 126 first of all run freely along grooves 132 until, shortly before the removal position, they are deflected downwards by a sloping control face 134. Approximately on reaching the end position, the ends 126 meet stop faces 136, whereupon the flip-over spring 70 snaps over so that the ends 126 take up the position "o". As the disc 56 is reinserted, the flip-over spring 70 snaps back without any great resistance, the ends 126 reaching the position "x". If the disc-holder 18 is now reinserted, the ends 126 run past the control face 134, in so doing undergoing slight resilient deflection.

With suitable adaptation the various forms of embodiment of disc-holders 18 and ejection mechanisms can be used interchangeably.

I claim:

1. Container for a gramophone record or video disc (56) having a housing (10) in which at least one holder (18) accommodating in each case one disc (56) is slideably guided between an inner storage position and an outer removal position into which the holder (18) is biassed by a spring assembly (40), and having a locking arrangement (42, 48) which holds the holder (18) in its storage position in the housing (10) against the spring bias and is manually releasable, wherein each holder (18) has a front wall (32) which covers the housing opening in the storage position, and wherein, in the removal position, front wall (32) is pivoted transversely with respect to the alignment of the disc (56) to such an extent that the disc (56) is removable in alignment, while an ejection mechanism acting on the disc (56) in the removal position is provided which transports the disc (56) further in the ejection direction to such an extent relative to the front wall (32) that it may be gripped pincer-fashion by its main surfaces.

2. Container according to claim 1, characterised in that the front wall (32) may be swung down by a main part of the holder.

3. Container according to claim 1, characterised in that, in the removal position, the front wall (32), together with at least one part (30) of the holder (18), is tilted relative to the housing (10).

4. Container according to claim 1 characterised in that at least that face of the container facing towards the tracked side of the disc (56) is recessed in the manner of a trough.

5. Container according to claim 4, characterised in that all faces of the container facing towards the main faces of the disc are recessed in the manner of a trough.

6. Container according to claim 1, characterised in that the ejection mechanism comprises a spring assembly (100) which is prestressed in the storage position.

7. Container according to claim 6, characterised in that a common spring assembly (100) is provided for the ejection of the holder (18) and the further transport of the disc (56).

8. Container accordng to claim 1, characterised in that the ejection mechanism comprises a reversible device which may be changed over during the movement of the holder (18) from the storage position into the removal position.

9. Container according to claim 8, characterised in that the reversible device comprises a flip-over spring assembly (70).

10. Container according to claim 9, characterised in that the flip-over spring assembly (70) may be snapped over by stop members on the housing under the influence of the spring assembly (40), or by manual, inwardly directed pressure on the holder (18).

11. Container according to claim 3, characterised in that the holder (18) includes an outer frame (30) having the front wall (32), which frame (30) is pivotable with respect to the remainder of the holder (18).

12. Container according to claim 11, characterised in that the frame (30) has lateral, approximately triangular cut-outs (36) which define the pivoting range of the frame (30).

13. Container according to claim 11, characterised in that the spring assembly (40) acts eccentrically on the frame (30) in order to impart a tilting moment thereto.

14. Container according to claim 11, characterised in that the holder (18) comprises a part to be ejected (54, 100) which is coupled to the outer frame (30) in the storage position and may be disengaged to achieve the removal position and on which the spring assembly (70, 110) acts.

15. Container according to claim 14, characterised in that the part to be ejected (54, 100) accommodates the disc (56).

16. Container according to claim 14, characterised in that the part to be ejected (54, 100) is slideably guided in the holder (18) over a predetermined path.

17. Container according to claim 14, characterised in that the part to be ejected (54) is biassed by the flip-over spring assembly (70) into the removal position and may be coupled up to the holder (18) by pressure in the insertion direction, wherein the coupling is disengaged again in the storage position.

18. Container according to claim 1, characterised in that the spring assembly (40) comprises a leaf spring.

19. Container according to claim 1, characterised in that the locking arrangement (42, 48) is designed to be self-locking upon insertion of the holder (18) into the housing (10).

20. Container according to claim 19, characterised in that the locking arrangement comprises a latch (42) locking into a catch aperture (48), which latch is releasable by means of a manually operated button (46).

21. Container according to claim 1, characterised in that the holder (18) has resiliently yielding checking members (66) which position themselves against the circumferential edge of an inserted disc (56) in the region of its half nearest to the front wall (32), which checking members yield resiliently upon insertion of a disc (56) to a distance apart that is the same as the diameter of the disc.

22. Container according to claim 21, characterised in that the checking members (66) are moulded integrally on the holder (18) or part to be ejected (54) which are injection-moulded from plastics.

23. Container according to claim 21 characterized in that the center point of the disc and the points of contact of the checking members define angles in a range of 90° to 160°.

24. Container according to claim 1, characterised in that the housing (10) and at least those parts of the holder (18) that are subjected to no resilient stress are constructed as injection-moulded plastics parts.

* * * * *